US012811848B2

(12) United States Patent
Ficara et al.

(10) Patent No.: US 12,811,848 B2
(45) Date of Patent: Nov. 24, 2026

(54) TROUBLESHOOTING TRIGGER

(71) Applicant: Cisco Technology, Inc., San Jose, CA (US)

(72) Inventors: Domenico Ficara, Essertines-sur-Yverdon (CH); Ugo Mario Campiglio, Morges (CH); Leo Caldarola, Morrens (CH); Jerome Henry, Pittsboro, NC (US); Amine Choukir, Lausanne (CH); Arun G. Khanna, Sunnyvale, CA (US)

(73) Assignee: Cisco Technology, Inc.

( * ) Notice: Subject to any disclaimer, the term of this patent is extended or adjusted under 35 U.S.C. 154(b) by 286 days.

(21) Appl. No.: 18/300,155

(22) Filed: Apr. 13, 2023

(65) Prior Publication Data

US 2024/0348493 A1 Oct. 17, 2024

(51) Int. Cl.
*H04L 41/069* (2022.01)

(52) U.S. Cl.
CPC .................................. *H04L 41/069* (2013.01)

(58) Field of Classification Search
CPC .................................................... H04L 41/069
USPC ......................................................... 709/224
See application file for complete search history.

(56) References Cited

U.S. PATENT DOCUMENTS 7,251,685 B1 7/2007 Yildiz
9,183,072 B1 * 11/2015 Makuch ............. G06F 11/0709
9,652,364 B1 5/2017 Kaila et al.
11,838,169 B1 * 12/2023 Sudletsky ............... H04L 43/04
2002/0146023 A1 * 10/2002 Myers ................. H04L 47/2416 370/537
2004/0236851 A1 11/2004 Kuan et al.
2010/0246416 A1 9/2010 Sinha et al.
2011/0131295 A1 6/2011 Jolfaei
2012/0246303 A1 * 9/2012 Petersen ............ G06F 16/1734 709/224
2013/0295854 A1 11/2013 Olson et al.
2014/0132777 A1 * 5/2014 Beyabani ............ G06F 11/0748 348/180
2015/0006879 A1 * 1/2015 Naim ...................... H04L 63/20 709/224
2015/0208310 A1 7/2015 Taneja et al.
2015/0382212 A1 12/2015 Elliott et al.
2016/0112886 A1 4/2016 Malik et al.
2017/0286560 A1 * 10/2017 Shao ....................... H04L 67/10
2018/0131751 A1 5/2018 Jones
2018/0176101 A1 * 6/2018 Stephenson ......... H04L 43/0811
(Continued)

OTHER PUBLICATIONS

Samhat, A. et al. "Automated Troubleshooting in WLAN Networks" IEEE Xplore; Sep. 4, 2007 (4 pages).
(Continued)

*Primary Examiner* — Wing F Chan
*Assistant Examiner* — John Fan
(74) *Attorney, Agent, or Firm* — Merchant & Gould P.C.

(57) ABSTRACT

A troubleshooting trigger may be provided. A first computing device may provide, to a second computing device, data indicating a troubleshooting capability protocol. Next, first computing device may receive, from the second computing device, a troubleshooting request in accordance with the troubleshooting capability protocol. The first computing device may then perform the troubleshooting request in accordance with the troubleshooting capability protocol.

20 Claims, 4 Drawing Sheets

(56) References Cited

U.S. PATENT DOCUMENTS

| | | | |
|---|---|---|---|
| 2019/0097872 | A1 | 3/2019 | Lee et al. |
| 2019/0149443 | A1 | 5/2019 | Gunasekara et al. |
| 2020/0036698 | A1 | 1/2020 | Ray et al. |
| 2021/0099369 | A1 | 4/2021 | Huang et al. |
| 2022/0014448 | A1 | 1/2022 | Khoury et al. |
| 2024/0250865 | A1 | 7/2024 | Moreira Martins et al. |
| 2024/0323229 | A1 | 9/2024 | Bernsen et al. |

OTHER PUBLICATIONS

International Search Report and Written Opinion for International Application No. PCT/US2024/023921, mailed Jun. 17, 2024, 15 Pages.

International Search Report and Written Opinion issued in International Application No. PCT/US2024023811, mailed Jun. 17, 2024 (15 pages).

* cited by examiner

TROUBLESHOOTING TRIGGER

TECHNICAL FIELD

The present disclosure relates generally to providing a troubleshooting trigger.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
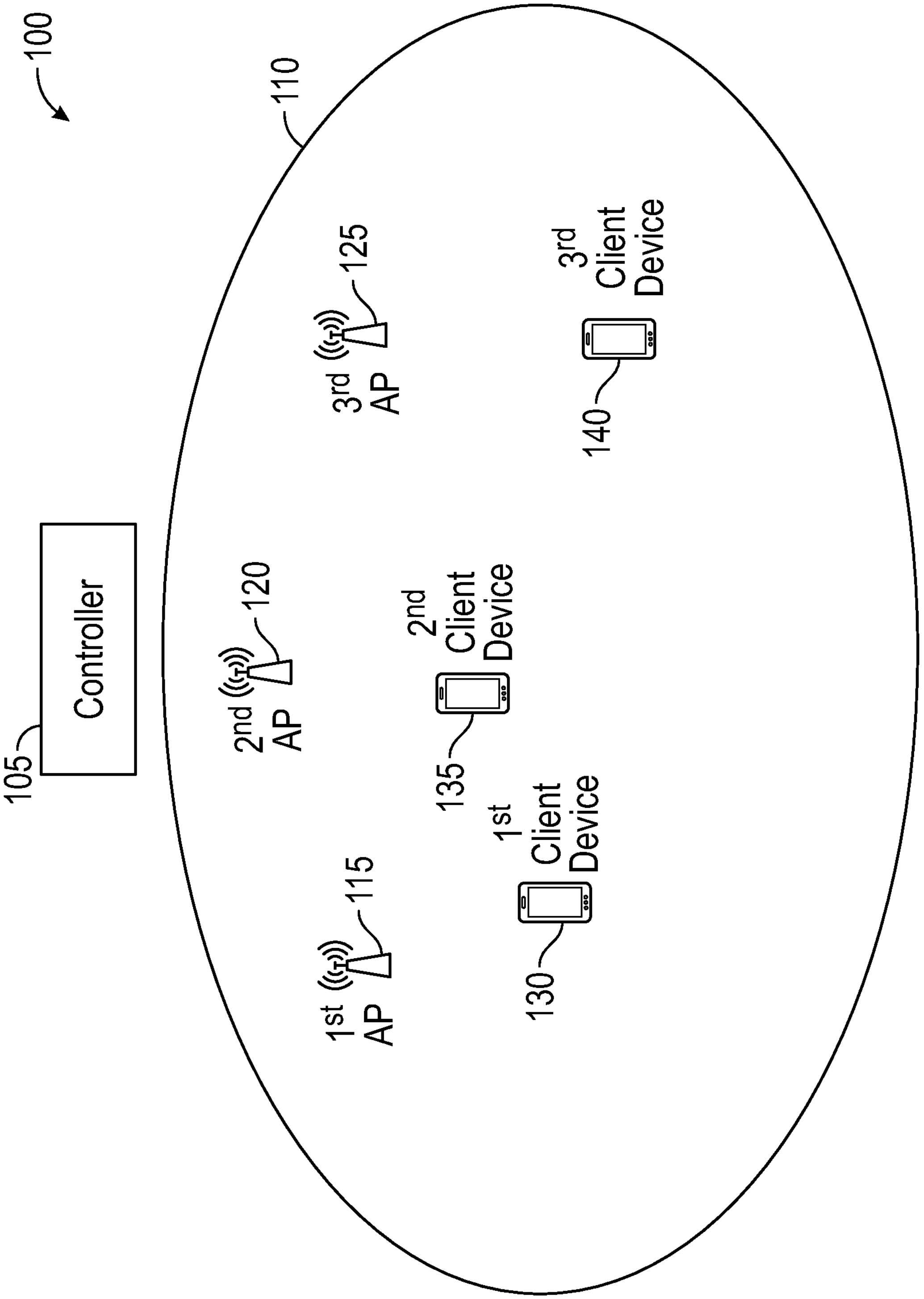
FIG. 1 is a block diagram of an operating environment for providing a troubleshooting trigger.

A troubleshooting trigger may be provided. A first computing device may provide, to a second computing device, data indicating a troubleshooting capability protocol. Next, first computing device may receive, from the second computing device, a troubleshooting request in accordance with the troubleshooting capability protocol. The first computing device may then perform the troubleshooting request in accordance with the troubleshooting capability protocol.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Troubleshooting Wi-Fi issues may be challenging because the troubleshooter may only has a partial view of the scene. The Access Point (AP) may log elements that may include operational data (e.g., the time of a client message, its Received Signal Strength Indicator (RSSI), or Signal to Noise Ratio (SNR), etc.) and standard data (e.g., the details of the client frame and its various Information Elements (IEs)). The client device may perform mostly the same operations. Each side may then decide which events are beyond some normality threshold and should be logged to indicate an issue (e.g., excessive retries or a failure to complete a specific transaction).

In many cases, however, a user may signal issues while one or both sides did not detect any particular failure. In other cases, one side may detect a problem, but it's log may indicate that the other side failed to produce the expected answer. In both scenarios, the troubleshooting effort may end up in a dead-end with the support team left with the task of attempting to reproduce the issue. Accordingly, there may be a need for a process for the AP and the client device (i.e., a Station (STA)) to work together to address issues and facilitate troubleshooting scenarios. Embodiments of the disclosure may streamline the troubleshooting effort between a client device and an AP.

FIG. 1 shows an operating environment 100 providing a troubleshooting trigger. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi-Link Operation (MLO) where they simultaneously transmit and receive across different bands and channels by establishing two or more links to two or more AP radios. These bands may comprise, but are not limited the 2 GHz band, the 5 GHZ band, the 6 GHz band, and the 60 GHz band.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide a troubleshooting trigger.

The elements described above of operating environment 100 (e.g., controller 105, first AP 115, second AP 120, third AP 125, first client device 130, second client device 135, or third client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
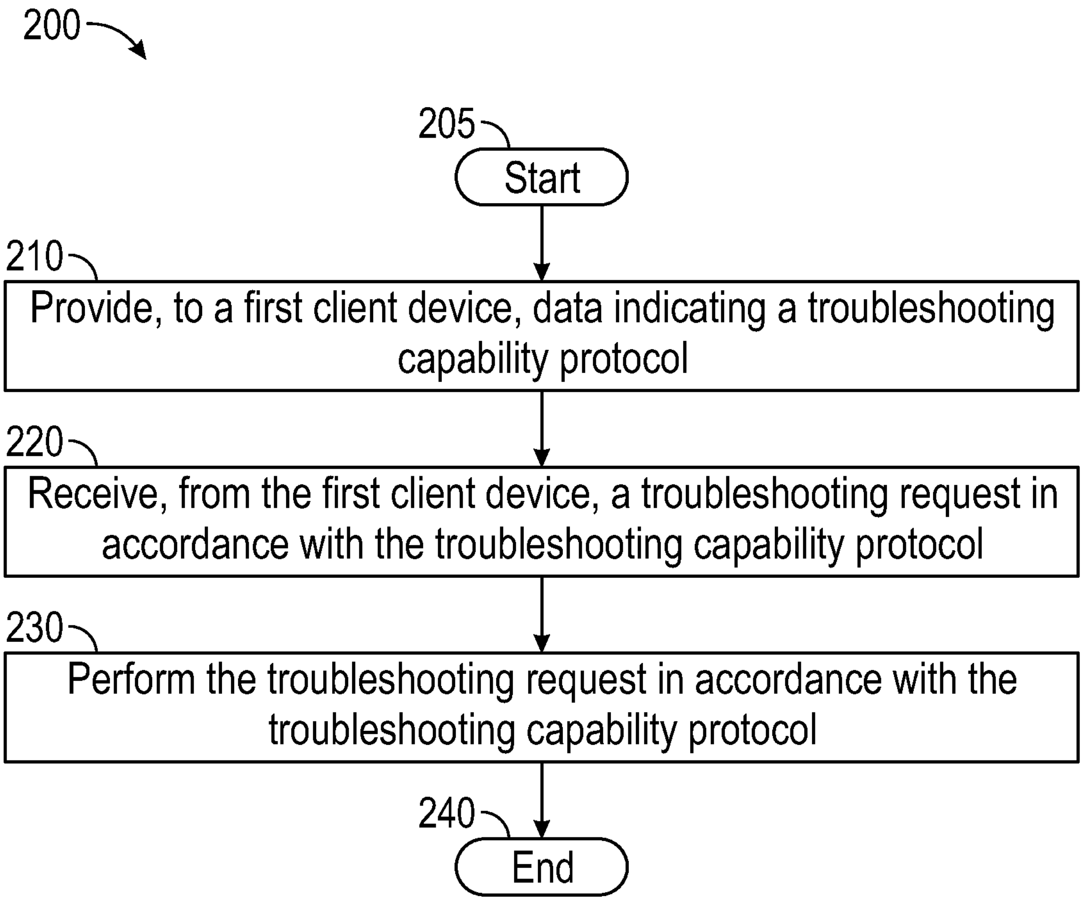
FIG. 2 is a flow chart of a method for providing a troubleshooting trigger.
Figure 3:
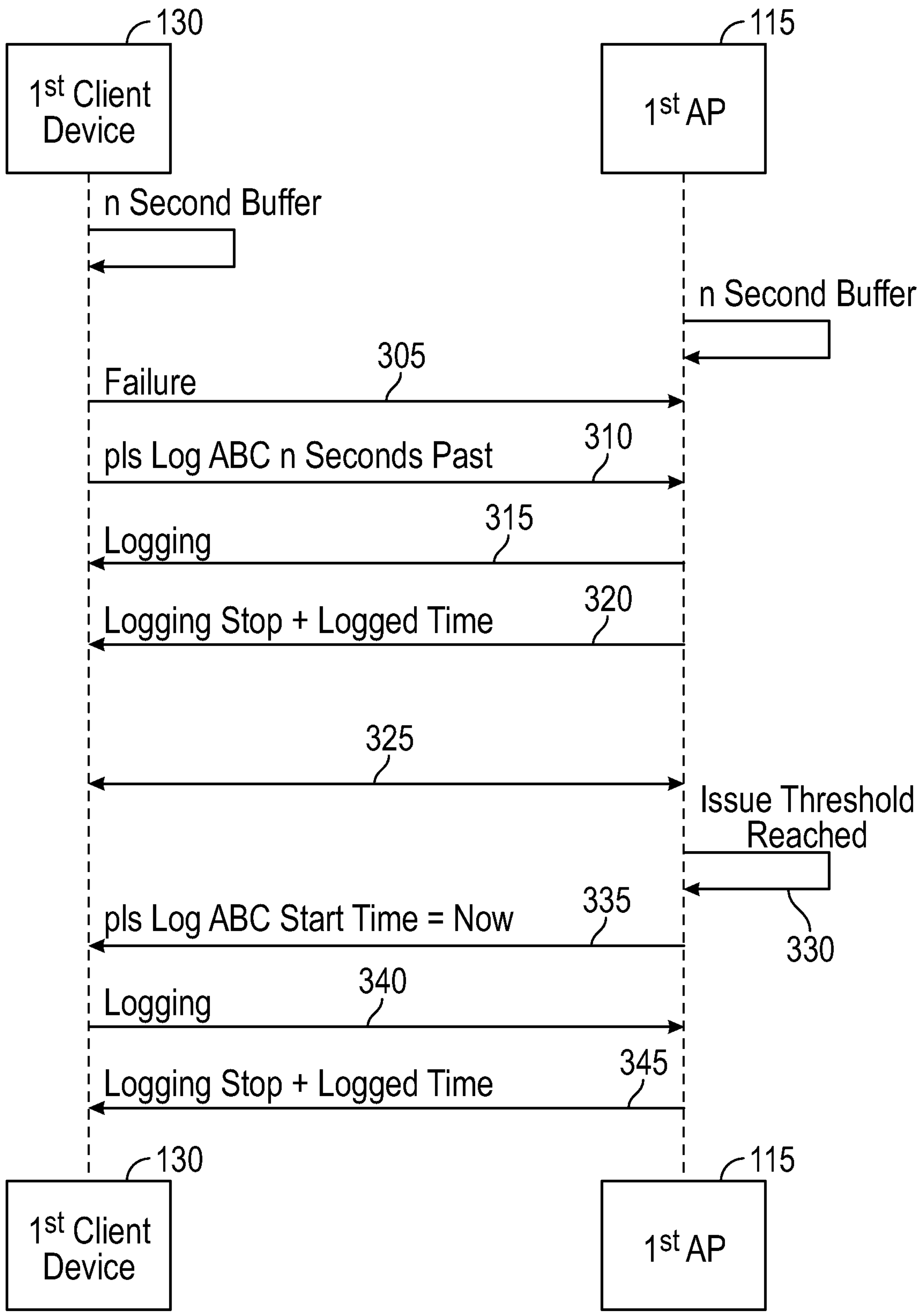
FIG. 3 is a diagram of a method for providing a troubleshooting trigger.

FIG. 2 is a flow chart setting forth the general stages involved in a method 200 consistent with embodiments of the disclosure for providing a troubleshooting trigger. Method 200 may be implemented using first AP 115 and first client device 130 as described in more detail above with respect to FIG. 1. FIG. 3 is a diagram used to further illustrate method 200. Ways to implement the stages of method 200 will be described in greater detail below.

Method 200 may begin at starting block 205 and proceed to stage 210 where first AP 115 may provide, to first client device 130, data indicating a troubleshooting capability protocol. For example, first AP 115 and first client device 130 may signal to each other a cooperative troubleshooting protocol capability at association time. This may be signaled, for example, in a capability fields in an IE. Some client devices and APs may implement a full version of the troubleshooting protocol (e.g., selective logging as described below), others may implement a simplified version of the protocol (e.g., log everything or nothing), others may not implement the protocol (e.g., legacy clients).

From stage 210, where first AP 115 provides, to first client device 130, data indicating the troubleshooting capability protocol, method 200 may advance to stage 220 where first AP 115 may receive, from first client device 130, a troubleshooting request in accordance with the troubleshooting capability protocol. For example, at any time after association, first client device 130 or first AP 115 may trigger the troubleshooting protocol with a request/response exchange (e.g., an action frame). The exchange may include one or more elements used as the trigger, one or more thresholds, and one or more elements to log. For example, the triggers may include frame types 00, subtypes 0, 1, 2, 3 (management/association), the thresholds may include failure or delay>n ms", and the elements to log may include frame type 00 and timestamps. The query may target one or more applications by characterizing the application (e.g., a tuple, Domain Name Service (DNS) response, package name, etc.). The exchange may include a single set of elements or contain a list. The exchange may be allowed to occur at any time and a request/response may augment or update a previous request/response.

The exchange may also include capability information. For example, some systems may be able to monitor frames (e.g., 802.11 frames), but not their payload, thus may have no application monitoring capability. Similarly, some systems may be able to allocate a monitoring buffer, thus allowing for the ability to monitor events that occurred before a failure was detected.

Once first AP 115 receives, from first client device 130, the troubleshooting request in accordance with the troubleshooting capability protocol in stage 220, method 200 may continue to stage 230 where first AP 115 may perform the troubleshooting request in accordance with the troubleshooting capability protocol. For example, at any point in time, one side may detect an issue of either of two types: i) a failure or ii) a performance threshold (i.e., delay>n ms). In case of failure, the detecting side may request the other side to log. In full protocol and monitoring buffer-capability cases, the detecting side may signal the failure type (e.g., based on the action frame described above in) and a timer (e.g., association failure, 600 ms past). When a monitoring buffer capability was not expressed, the same signaling may occur (e.g., without the timer), and the detecting side re-attempts the exchange, thus causing both sides to log the attempt. In the case of a performance threshold being reached, the detecting side may signal the target element (e.g., based on action frame described above in) along with a request to log.

In both cases, the other side may confirm that it starts logging. In an embodiment of the disclosure, the response may also include a flag signaling whether the responder also detected the flagged issue. In another embodiment, the request and/or the response may also include a logging timer that indicates the duration of the intended logging action.

In yet another embodiment (i.e., basic protocol implementation), each side may only be statically configured to log certain types of events without granularity). Thus the signaling may be limited to “issue detected, please log” for example.

At the end of the logging timer (e.g., either exchanged for full protocol implementers, or determined locally for basic implementations), the logging may stop and the corresponding side may signal the event to the other. The other side may also stop logging. In another embodiment, logging may stop early because of a triggering event, such as ‘buffer full’, or ‘issue no longer detected’ (e.g., for more than x seconds). In all cases, the stopping side may signal to the other side.

In one embodiment, the side that triggered the logging may request the log from the other side. In a variation of this embodiment, the logs may be sent to a location expressed by the requester. In all cases, both sides may confirm that the event logs are completed and thus that the event log, seen from both sides, is available for a support team.

As shown in FIG. 3, first AP 115 and first client device 130 may be exchanging data. Stages 305 through 320 illustrate the failure issue type and stages 330 through 345 illustrate the a performance threshold issue type. For example, first client device 130 may detect a failure and signal the failure to first AP 115 (stage 305). First client device 130 may also signal which elements to log (e.g., ABC) and how far in the past (e.g., n seconds) the logging should start (stage 310). Because first AP 115 may have a buffer, events may be logged that happened before the failure. First AP 115 may signal to first client device 130 that logging has begun (stage 315). First AP 115 may also signal to first client device 130 that logging has stopped and at what time it was stopped (stage 320).

The failure may have been solved and first AP 115 and first client device 130 may be exchanging data again (stage 325). However, a performance threshold (i.e., delay>n ms) may have been reached (stage 330). Accordingly, first AP 115 may signal this to first client device 130, which elements to log (e.g., ABC), and when to start (e.g., now) the logging (stage 335). First client device 130 may signal to first AP 115 that logging has begun (stage 340). First AP 115 may signal to first client device 130 that logging has stopped and a what time it was stopped (stage 345). As illustrated by FIG. 3, either side (e.g., first client device 130 or first AP 115) may initiate a signal that an issue exists (e.g., failure or a performance threshold). Either side (e.g., first client device 130 or first AP 115) may initiate stopping the logging. Once first AP 115 performs the troubleshooting request in accordance with the troubleshooting capability protocol in stage 240, method 200 may then end at stage 250.

Legacy client devices may not support the signaling described above. Thus, embodiments of the disclosure may allow for an AP to designate a third-party observer. The observer may be used to capture the responses from the AP (e.g., just like the client device would if it supported the protocol). The third-party observer may also be used as a source of a second opinion when the client device supports the cooperative troubleshooting protocol described above. Although the third-party observer may not have the same Radio Frequency (RF) view as the client device, it may still successfully log the exchange and thus collect valuable information. In both cases, when a third-party observer is involved, the signaling occurs between the AP and the third-party observer when the third-party observer has Over The Air (OTA) reachability to the AP. A third radio may be used as the third-party observer, thus suppressing the need for the OTA signaling.

Figure 4:
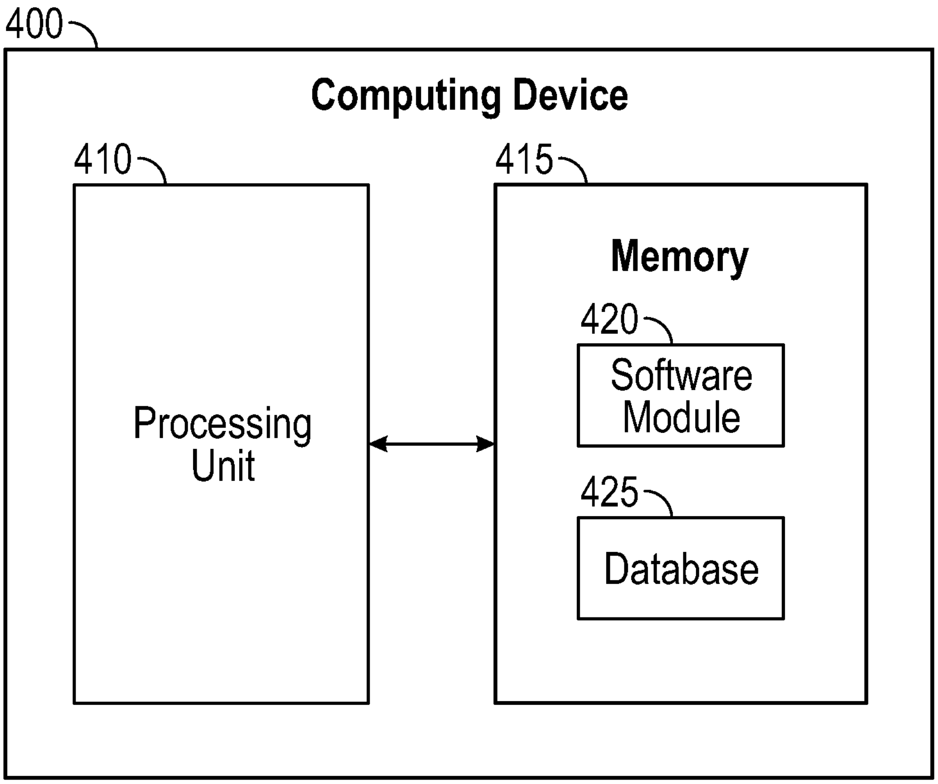
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing a troubleshooting trigger as described above with respect to FIG. 2. Computing device 400, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

providing, by a first computing device to a second computing device, data indicating a troubleshooting protocol capability;

receiving, by the first computing device from the second computing device, a troubleshooting request in accordance with the troubleshooting protocol capability; and performing, by the first computing device, the troubleshooting request in accordance with the troubleshooting protocol capability, wherein performing the troubleshooting request comprises:

confirming, by the first computing device to the second computing device, that the first computing device has started logging based on the troubleshooting request, signaling, by one of the first computing device and the second computing device to other of the first computing device and the second computing device, that the logging has stopped at the one of the first computing device and the second computing device, stopping the logging by the other of the first computing device and the second computing device in response to receiving the signal that the logging has stopped at the one of the first computing device and the second computing device, and sharing, by the first computing device, a log to the second computing device.

2. The method of claim 1, wherein performing the troubleshooting request comprises, when the troubleshooting request has a type indicating a failure, logging elements indicated by the troubleshooting request in the log and the type.

3. The method of claim 2, further comprising including logging elements that occurred prior to receiving the troubleshooting request when the troubleshooting request indicates an amount of time to go back in a buffer to obtain the elements that occurred prior to receiving the troubleshooting request.

4. The method of claim 1, wherein performing the troubleshooting request comprises, when the troubleshooting request has a type indicating a performance threshold has been met, logging elements indicated by the troubleshooting request in the log and the type.

5. The method of claim 1, wherein the troubleshooting request comprises elements used as a trigger, a troubleshooting request type, and elements to log.

6. The method of claim 5, wherein the troubleshooting request type comprises failure or performance threshold has been met, and wherein the elements to log comprise action frame type and a timestamp.

7. The method of claim 5, wherein the troubleshooting request indicates capability information.

8. The method of claim 7, wherein the capability information indicates application monitoring.

9. The method of claim 7, wherein the capability information indicates a monitoring buffer.

10. A system comprising:

a memory storage; and a processing unit disposed in a first computing device and coupled to the memory storage, wherein the processing unit is operative to:

provide, to a second computing device, data indicating a troubleshooting protocol capability;

receive, from the second computing device, a troubleshooting request in accordance with the troubleshooting protocol capability; and perform the troubleshooting request in accordance with the troubleshooting protocol capability, wherein the processing unit being operative to perform the troubleshooting request comprises the processing unit being operative to:

confirm, to the second computing device, that the first computing device has started logging based on the troubleshooting request, signal, by one of the first computing device and the second computing device to other of the first computing device and the second computing device, that the logging has stopped at the one of the first computing device and the second computing device, stop the logging by the other of the first computing device and the second computing device in response to receiving the signal that the logging has stopped at the one of the first computing device and the second computing device, and share a log to the second computing device.

11. The system of claim 10, wherein performing the troubleshooting request comprises, when the troubleshooting request has a type indicating a failure, logging elements indicated by the troubleshooting request in log and the type.

12. The system of claim 11, further comprising including logging elements that occurred prior to receiving the troubleshooting request when the troubleshooting request indicates an amount of time to go back in a buffer to obtain the elements that occurred prior to receiving the troubleshooting request.

13. The system of claim 10, wherein performing the troubleshooting request comprises, when the troubleshooting request has a type indicating a performance threshold has been met, logging elements indicated by the troubleshooting request in the log and the type.

14. The system of claim 10, wherein the troubleshooting request comprises elements used as a trigger, a troubleshooting request type, and elements to log.

15. The system of claim 14, wherein the troubleshooting request type comprise failure or performance threshold has been met, and wherein the elements to log comprise action frame type and a timestamp.

16. The system of claim 14, wherein the troubleshooting request indicates capability information.

17. The system of claim 16, wherein capability information indicates application monitoring.

18. The system of claim 16, wherein capability information indicates capability information indicates a monitoring buffer.

19. A non-transitory computer-readable medium that stores a set of instructions which when executed perform a method executed by the set of instructions comprising:

providing, by a first computing device to a second computing device, data indicating a troubleshooting protocol capability;

receiving, by the first computing device from the second computing device, a troubleshooting request in accordance with the troubleshooting protocol capability; and performing the troubleshooting request in accordance with the troubleshooting protocol capability, wherein performing the troubleshooting request comprises:

confirming, by the first computing device to the second computing device, that the first computing device has started logging based on the troubleshooting request, signaling, by one of the first computing device and the second computing device to other of the first computing device and the second computing device, that the logging has stopped at the one of the first computing device and the second computing device, stopping the logging by the other of the first computing device and the second computing device in response to receiving the signal that the logging has stopped at the one of the first computing device and the second computing device, and sharing, by the first computing device, log to the second computing device.

20. The non-transitory computer-readable medium of claim 19, wherein performing the troubleshooting request comprises, when the troubleshooting request has a type indicating a failure, logging elements indicated by the troubleshooting request in the log and the type.

* * * * *